(12) United States Patent
Borkholder

(10) Patent No.: US 12,741,704 B2
(45) Date of Patent: Sep. 22, 2026

(54) DYNAMICALLY ADJUSTABLE GOOSENECK BALL MOUNT

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 360 days.

(21) Appl. No.: 18/438,682

(22) Filed: Feb. 12, 2024

(65) Prior Publication Data

US 2025/0256791 A1 Aug. 14, 2025

(51) Int. Cl.
*B62D 53/08* (2006.01)

(52) U.S. Cl.
CPC ................................ *B62D 53/0814* (2013.01)

(58) Field of Classification Search
CPC ........................ B62D 53/0814; B62D 53/0807
See application file for complete search history.

(56) References Cited

U.S. PATENT DOCUMENTS 3,796,444 A * 3/1974 Hixon ...................... B60D 1/06 280/483
6,981,715 B1 * 1/2006 Aylett ................ B62D 53/0807 280/441
7,490,846 B2 * 2/2009 Kaun ................. B62D 53/0814 280/441
7,753,392 B2 7/2010 Warnock
8,333,399 B2 12/2012 Brown et al.
9,186,942 B1 11/2015 Waggoner et al.
9,511,804 B2 12/2016 Curl et al.
2011/0210529 A1 9/2011 Markstaller
2013/0297154 A1 11/2013 Burchett et al.

FOREIGN PATENT DOCUMENTS

GB 2470610 A * 12/2010 ........... B62D 15/023

* cited by examiner

*Primary Examiner* — Jacob D Knutson
(74) *Attorney, Agent, or Firm* — Sanders Pianowski LLP

(57) ABSTRACT

A dynamically adjustable gooseneck mount has a linear actuator that is removably affixed to a towing vehicle over the vehicle's rear axle. A gooseneck ball is affixed to a movable portion of the actuator and can move between a forward position and a rearward position through operation of a motor. The mount includes a sensor that can sense a flag that is attached to the coupler on a trailer. When the sensor detects the flag, the motor moves the gooseneck ball forward. If the towing vehicle and trailer are at a sufficient angle with respect to each other, the sensor no longer detects the flag and moves the gooseneck ball rearward. In the forward position, the gooseneck ball is forward of the axle and in the rearward position, the gooseneck ball is behind the axle.

18 Claims, 11 Drawing Sheets

92
82
44
72
58
100
46
45
104
124
68
63
62
65
126
120
122
105
52
50
64
66
70
42
48
102
56
60

44
46'
45
105
42
64
62
66

106
94
44
92
32
90
80
30
42
34
54
10
106

DYNAMICALLY ADJUSTABLE GOOSENECK BALL MOUNT

BACKGROUND OF THE INVENTION

The present disclosure relates to devices that attach a trailer to a towing vehicle. 5$^{th}$ wheel and gooseneck trailers have towing setup requirements, such as locating the tongue weight of the trailer over the towing vehicle's axle. For short bed trucks, locating the tongue weight directly over the axle places the front of some trailers (such as recreational vehicles) close enough to the cab that turning too tightly causes the front of the trailer to contact the cab, damaging both the trailer and truck. Other devices have attempted to solve this problem by positioning the trailer connection point rearward of the axle. By positioning the trailer rearward, the problem created by turning is solved, but the rearward bias of the tongue load makes the entire towing dynamic of truck and trailer less stable. Further, the increased distance between the truck cab and nose of the trailer increases wind resistance and lowers fuel economy.

Since tight turning is only performed when parking or moving at slow speeds, the trailer connection point only needs to be biased rearward periodically. Others have attempted to solve this problem, such as the sliding 5$^{th}$ wheel hitches in U.S. Pat. Nos. 7,753,392 and 9,511,804. This device only works with 5$^{th}$ wheel and pin box connections and requires a part to be affixed to the trailer to engage with the entry slot of the 5$^{th}$ wheel hitch plate and prevent the trailer from rotating with respect to the 5$^{th}$ wheel. Instead, the mechanism is forced to rotate the 5$^{th}$ wheel when the truck turns with respect to the trailer. This causes a mechanism to rotate and slide rearward through a large rack and pinion gear engagement or cam following a slot. This setup is not applicable to a gooseneck trailer, as there is no simple way to keep the trailer from rotating with respect to the connection point. Further, binding of the mechanical components can create unexpected torsional stress in the pin box or accidents from unduly restricted movement between truck and trailer. Other known issues with this setup includes wear or slop in the mechanism that causes undesirable chucking or banging between the truck and trailer. An improved device is needed.

SUMMARY OF THE INVENTION

The present disclosure describes an assembly for attaching a trailer to a towing vehicle having an axle. The assembly comprises a base frame configured to be removably affixed to said towing vehicle with the base frame partially overlaying the vehicle's rear axle. A linear actuator has a stationary portion affixed to the base frame and a movable portion affixed to a gooseneck ball. The movable portion is longitudinally moveable between a fore position and an aft position. The assembly has a controller in electrical communication with a sensor and the linear actuator. The trailer has a coupler that mates to the gooseneck ball and has a sensor flag. When the trailer coupler and vehicle are aligned, the sensor detects the sensor flag. When the sensor detects a first angle between the trailer and towing vehicle, the linear actuator moves the gooseneck ball to a first position. When the sensor detects a second angle between the trailer and towing vehicle, the linear actuator moves the gooseneck ball to a second position.

DESCRIPTION OF THE PREFERRED EMBODIMENT

Figure 1:
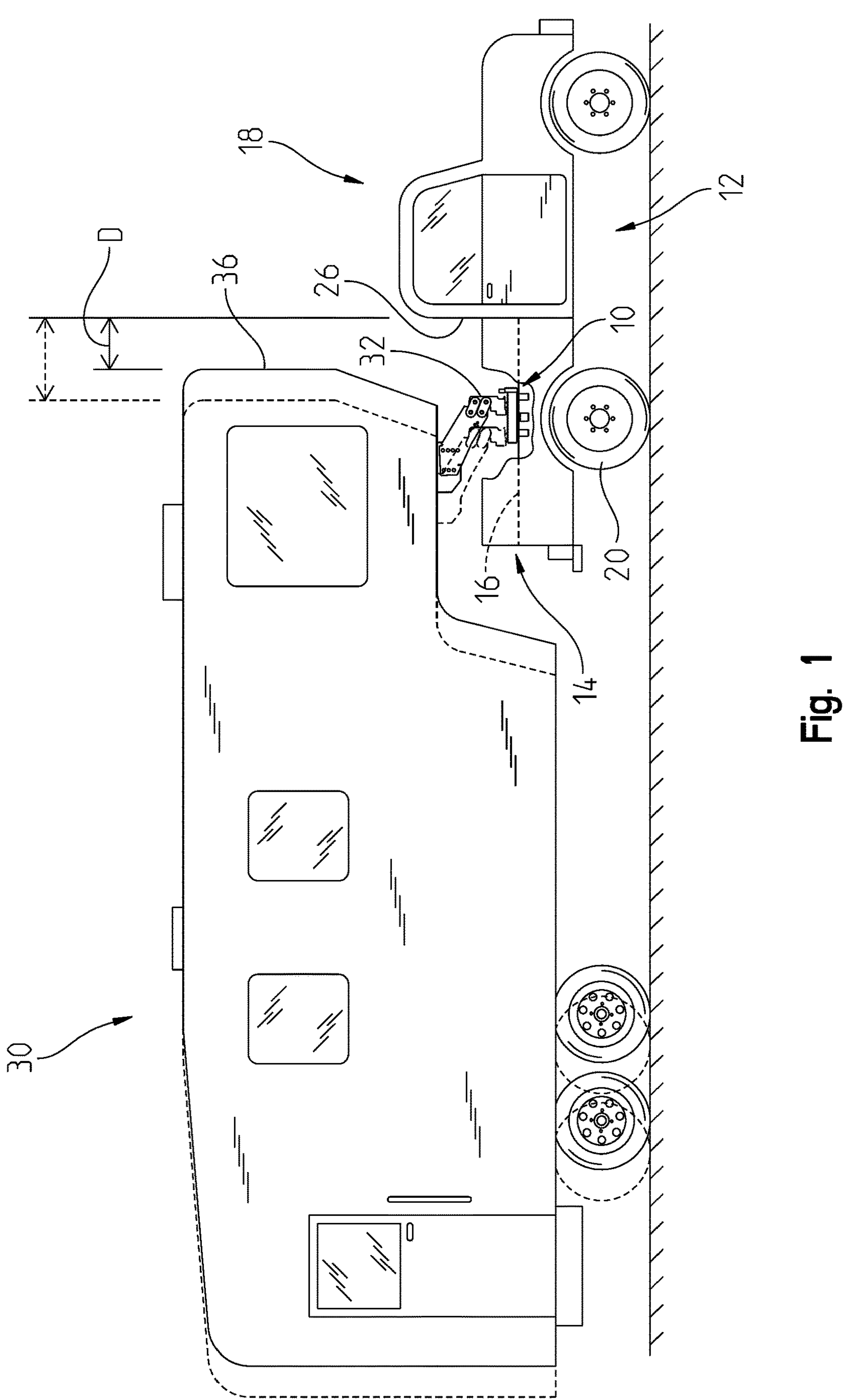
FIG. 1 is a side view of a trailer coupled to a towing vehicle.
Figure 2:
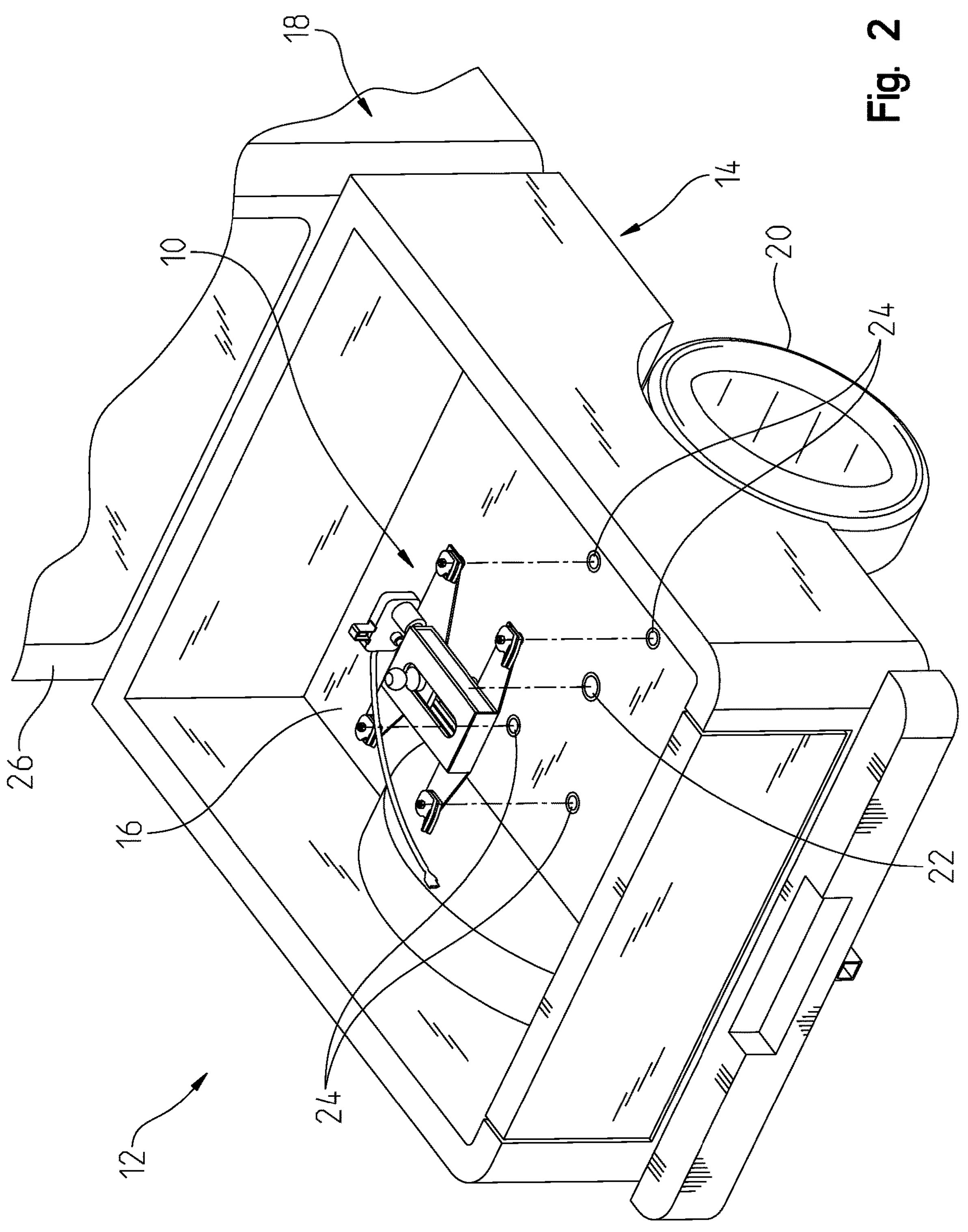
FIG. 2 is a top isometric view of the towing vehicle and coupler in FIG. 1.

A trailer coupler 10 is shown in FIG. 1 that attaches to the bed of a towing vehicle 12. The towing vehicle 12 has a bed 14 with a floor 16 and a cab 18 that is forward of the bed 14. The bed 14 is located over an axle 20 and may consist of a flat surface, frame rails, or other type of mounting platform that allows secure attachment to the vehicle's structure. The mounting platform or bed 14 may include a puck system that has a gooseneck pocket 22 and at least one additional anchor point 24. In the embodiment shown in FIG. 2, the towing vehicle 12 has four anchor points 24 that are spaced from the gooseneck pocket 22. The gooseneck pocket 22 is laterally (side to side) centered over the axle 20 but may be longitudinally (fore or aft) offset from the axle 20. For the purposes of this disclosure, longitudinal movement or position is in the direction of travel of the towing vehicle. The gooseneck pocket 22 and anchor points 24 are rigidly affixed to the vehicle's frame and accessed at or through the floor 16 of the bed 14. The trailer coupler 10 is designed to mate with a trailer 30, shown in FIG. 3. It is contemplated that the towing vehicle 12 uses an alternative device or method for attaching, such as a bed rail system (not shown). Bed rail systems typically consist of two parallel rails mounted over the rear axle in a direction perpendicular to the direction of travel.

As shown, the trailer 30 has a gooseneck coupler 32 that provides a secure connection to a gooseneck ball 46. The gooseneck coupler 32 has a lead-in flange 34 that leads to a ball pocket. When the gooseneck coupler 32 is latched, the spherical portion of the gooseneck ball is trapped while still allowing rotation of the gooseneck ball 46 with respect to the gooseneck coupler 32. In other words, the gooseneck coupler 32 does not impart rotational movement to the gooseneck ball 46. The trailer 30 has a front surface 36 that faces the rear surface 26 of the cab 18, shown in FIG. 1. The distance D between the front surface 36 of the trailer 30 and rear surface 26 of the cab 18 varies based on the individual towing vehicle 12 and trailer 30.

Figure 6:
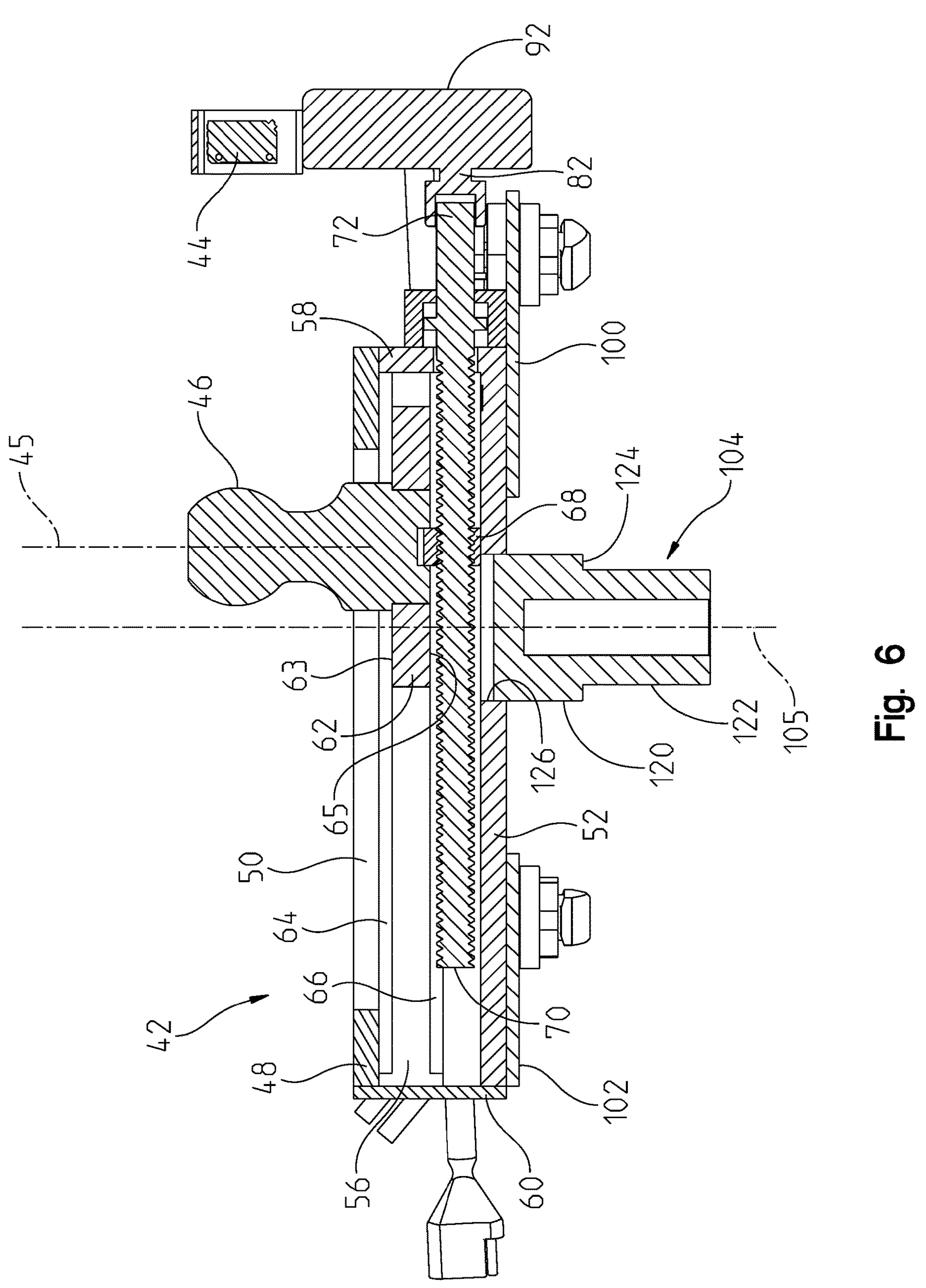
FIG. 6 is a side section view 6-6 of the coupler in FIG. 4 in the fore position.
Figure 7:
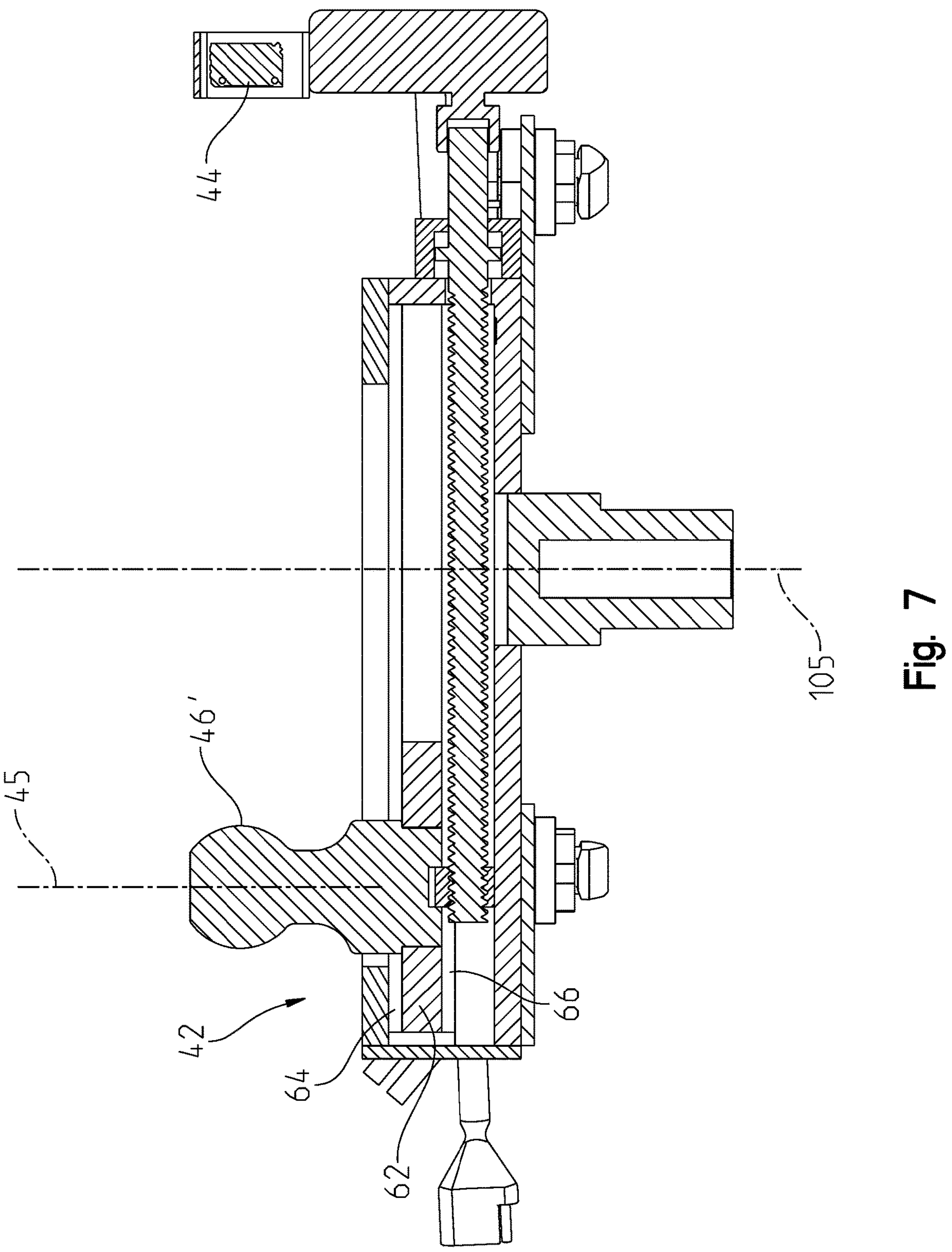
FIG. 7 is a side section view 6-6 of the coupler in FIG. 4 in the aft position.
Figure 8:
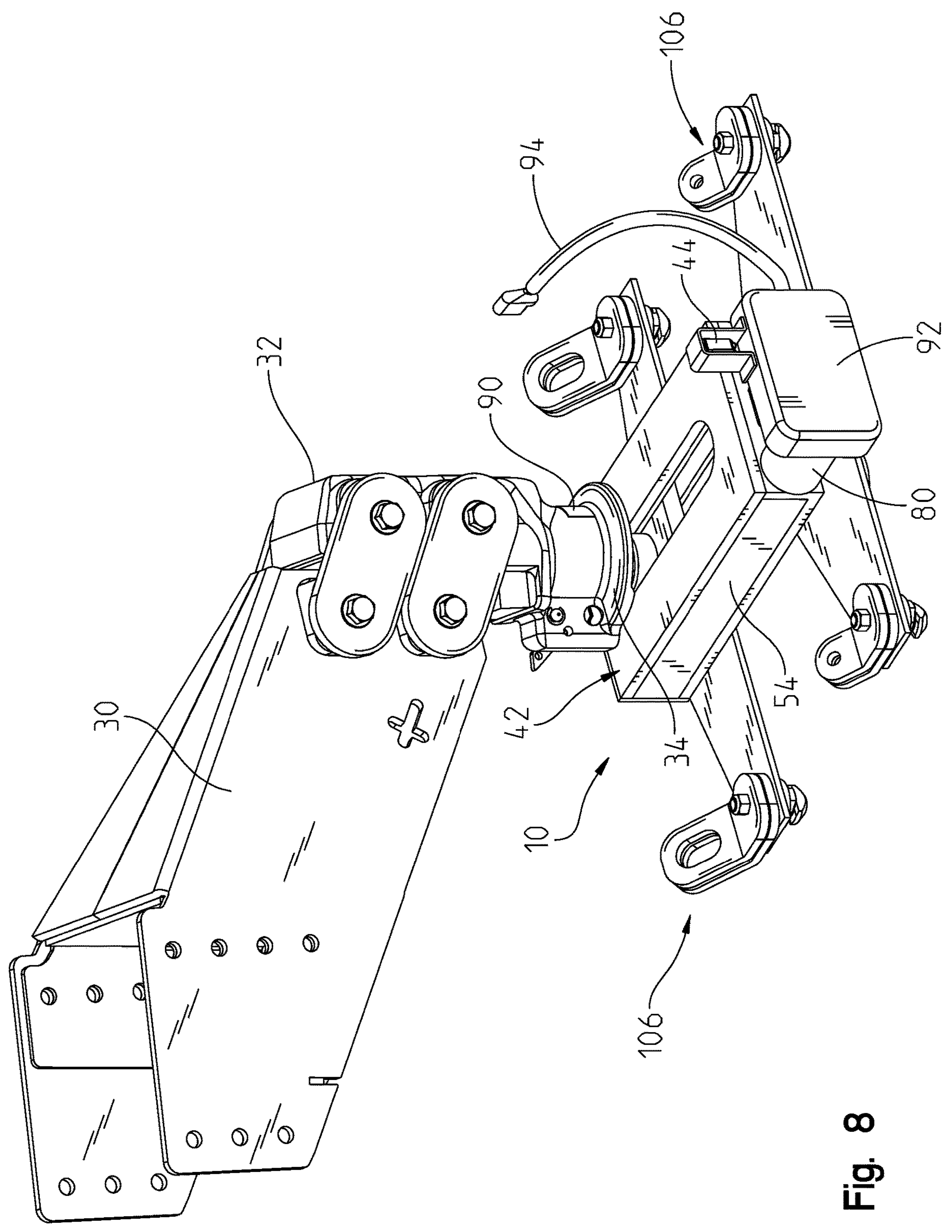
FIG. 8 is a top isometric view of the coupler in the aft position.

The trailer coupler 10 has a base frame 40 that has a linear actuator 42, a sensor 44, and components for affixing the trailer coupler 10 to the towing vehicle 12. The linear actuator 42 is an assembly of components that cooperate to support and move the gooseneck ball 46 longitudinally between a fore position (shown in FIG. 6) and an aft position (shown in FIG. 7). Throughout the travel of the linear actuator 42, the gooseneck ball 46 does not rotate and only moves in a longitudinal direction with respect to the towing vehicle 12. The linear actuator 42 is a structural component that carries the load applied to the gooseneck ball 46 and transfers it to the towing vehicle 12. The linear actuator 42 can move to any position between the fore and aft positions while carrying the load of the trailer. The gooseneck ball 46 has a gooseneck axis 45 that extends vertically as shown in FIG. 6. The linear actuator 42 has a top plate 48 with an elongate slot 50. The elongate slot 50 has a fore end 51 and an aft end 53 located opposite from the fore end 51. Parallel to the top plate 48 and spaced therefrom is a bottom plate 52. Along with the plates 48, 52, sides 54, 56 and end walls 58, 60 form the outer structure of the linear actuator 42 that form a partially enclosed volume. Located in the partially enclosed volume and sandwiched between the top and bottom plates 48, 52 is a sliding block 62. The sliding block 62 is a flat structural component, an upper surface 63 and lower surface 65. The gooseneck ball 46 is affixed to the sliding block 62 and extends through the elongate slot 50 to form a movable portion of the linear actuator. The sliding block 62 is supported by an upper bearing block 64 and a lower bearing block 66 that reduce friction when the sliding block 62 moves between the fore and aft positions. The bearing blocks 64, 66 can be a solid block of material with improved wear properties, a bearing assembly with moving parts, or equivalent. The length and width of the sliding block 62 transfers forces on the gooseneck ball 46 to the outer structure of the linear actuator 42. In other words, the linear actuator 42 transfers forces to the vehicle 12 that come from the gooseneck ball 46. A captured nut 68 is affixed or otherwise captured to the sliding block 62 so that movement of the captured nut 68 also moves the sliding block 62. As shown in section view FIG. 6, a screw shaft 70 is held within the linear actuator 42 and mated to the captured nut 68 so that when the screw shaft 70 rotates, the captured nut 68 creates fore or aft movement of the gooseneck ball 46. As shown, the screw shaft 70 is an Acme lead screw, but other screw types are contemplated. The screw shaft 70 protrudes through the end wall 58 where it is coupled to a motor 80. The motor 80 has an output shaft 82 that connects to a terminal end 72 of the screw shaft 70. The linear actuator 42 or motor 80 may include a position sensor (not shown) to communicate the position of the captured nut 68, gooseneck ball 46, or other movable components in the trailer coupler 10.

Figure 9:
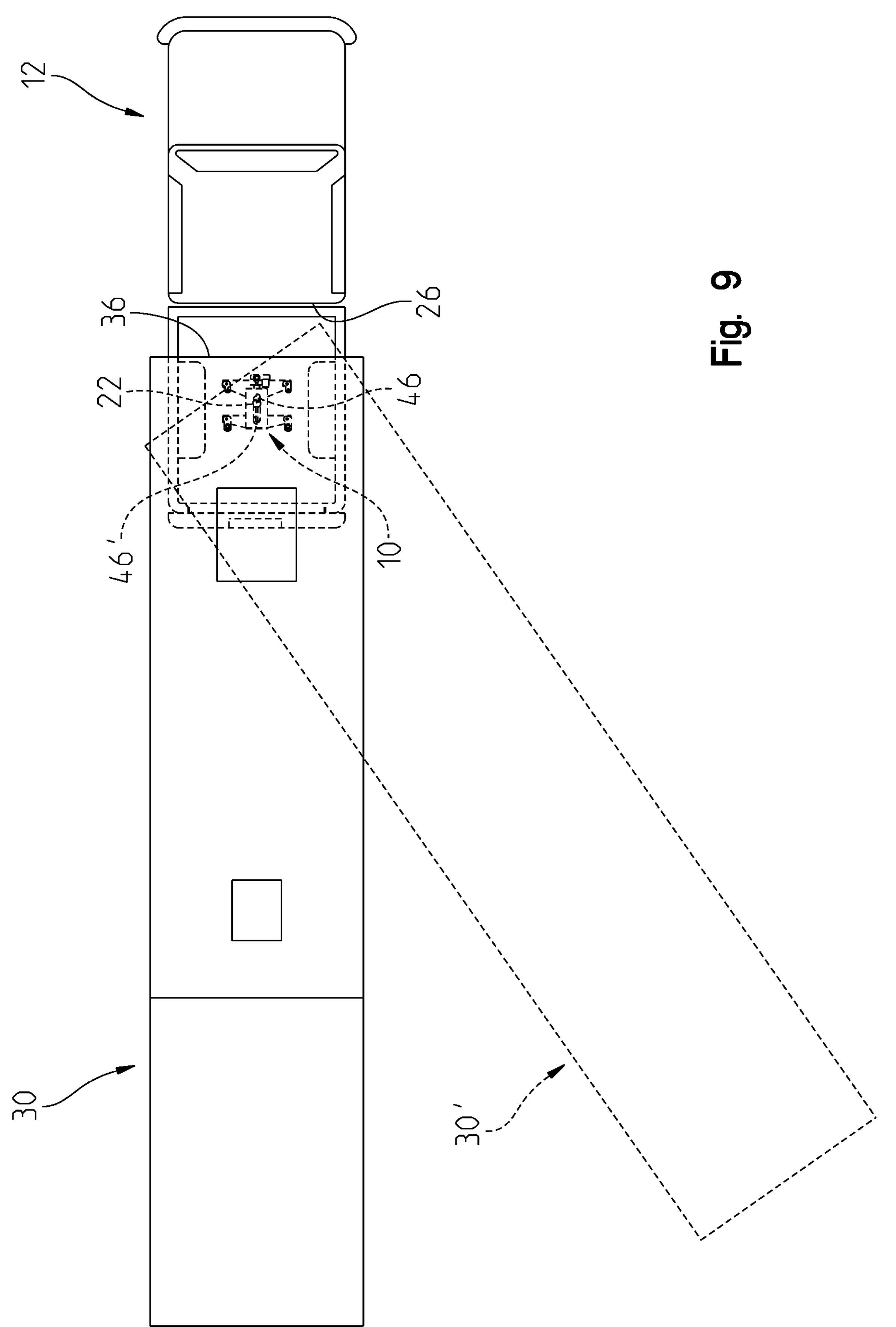
FIG. 9 is a top view of the towing vehicle and trailer in alignment and coupler in the fore position, along with the trailer at an angle and coupler in the aft position, shown in broken lines.

The sensor 44 is shown affixed to the motor 80, but other mounting options are contemplated. In the embodiment disclosed herein, the sensor 44 uses optical sensing technology to measure the presence or absence of a reflective flag 90. The flag 90 is affixed to the gooseneck coupler 32 that is affixed to the trailer 30. In the embodiment shown herein, the flag 90 has a width that translates to roughly 50 degrees of angular rotation of the trailer 30 in either direction before the flag 90 moves out of view of the sensor 44. When the towing vehicle 12 and trailer 30 are aligned (such as when traveling down a straight road), the sensor 44 detects the reflective flag 90. This is shown in FIG. 9 in solid lines. If the towing vehicle 12 and trailer 30 are at a large enough angle with respect to each other (such as when going around a corner or backing into a parking spot), the sensor 44 does not detect the reflective flag 90. In other words, if the sensor 44 doesn't detect the flag 90, the angle is above a predetermined limit. This is shown in FIG. 9 with the trailer 30' in broken lines. In the embodiment shown herein, the flag 90 is a band of material that is detected by the sensor 44 when located within the sensor's sensing range. If the flag 90 is outside of the sensing range, the sensor 44 provides a signal that it does not detect the flag 90. It is also contemplated that instead of a presence/absence detection of the reflective flag 90, the sensor 44 measures the angle between the towing vehicle 12 and trailer 30. In this case, the predetermined limit may be determined by a settings in the controller. Other non-contacting or contacting sensing technologies are contemplated, such as magnetic, proximity, photographic, resistive, pressure, or angle. It is further contemplated that the sensor 44 provides a distance measurement for the fore/aft position of the actuator by measuring the distance of the flag 90 or the flag 90 is a fiducial marker.

Figure 10A:
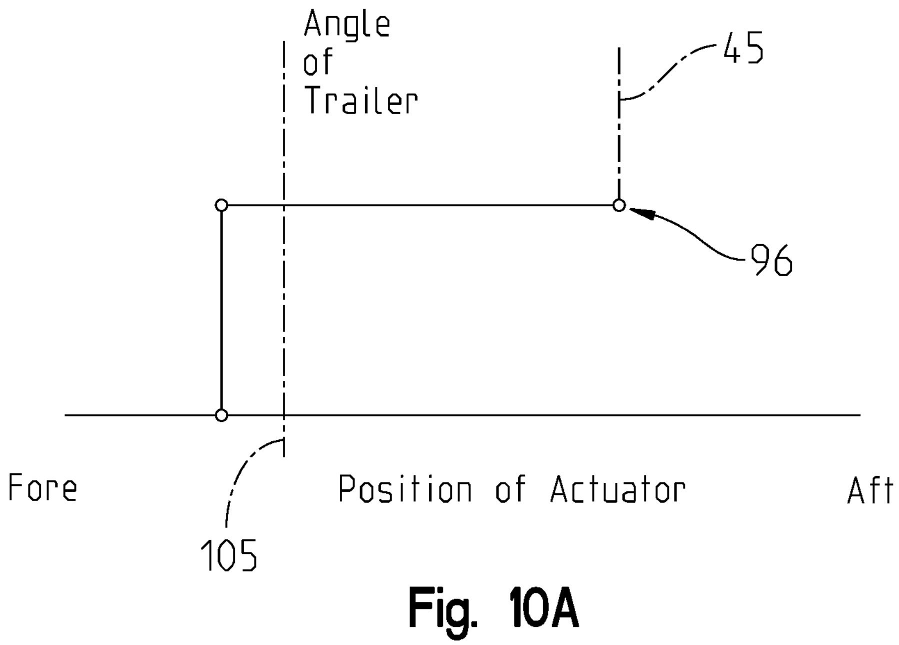
FIG. 10A is a graphical representation of the travel of the actuator versus the angle of the trailer using a digital sensor.
Figure 10B:
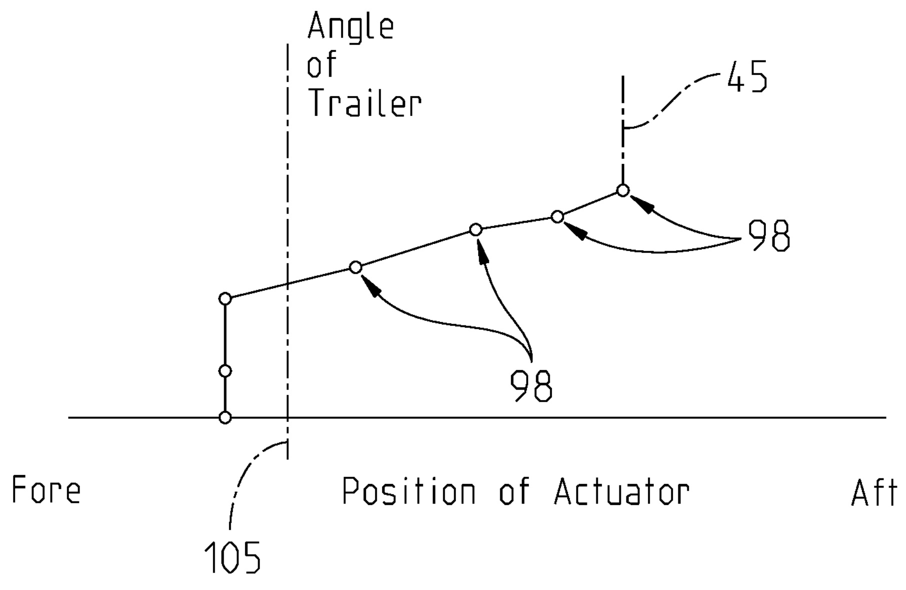
FIG. 10B is a graphical representation of the travel of the actuator versus the angle of the trailer using an angle sensor and programmable setpoints.

A controller 92 receives power through a power cord 94 and is in electrical communication with the sensor 44 and motor 80. If equipped, the position sensor for the linear actuator 42 is also in electrical communication with the controller 92. The controller 92 monitors the signal from the sensor 44 to determine the position of the trailer 30 relative to the towing vehicle 12. As shown in FIG. 9, the gooseneck ball 46 is moved forward when the trailer 30 and towing vehicle 12 are aligned. When the sensor 44 signals a sufficient angle between the towing vehicle 12 and trailer 30', the controller 92 enables the motor 80 to move the gooseneck ball 46 towards the aft position, shown as 46' in broken lines in FIG. 9. The relationship of the trailer angle and longitudinal position of the gooseneck ball is graphically represented in FIGS. 10A and 10B. FIG. 10A is a graph showing the position of the gooseneck ball 46 based on the angle of the trailer using a sensor 44 with a digital (on/off) output. When the angle is low and the sensor 44 can see the flag 90, the gooseneck ball 46 is in the fore position. In the embodiment shown herein, the fore position is forward of the gooseneck pocket 22 and stem axis 105, represented by the Y axis. The transition 96 between fore and aft in FIG. 10A occurs when the angle of the trailer causes the sensor 44 to no longer see the flag 90. When the sensor 44 detects that the towing vehicle 12 and trailer 30 are returning to alignment, the controller 92 enables the motor 80 to move the linear actuator 42 towards the fore position. For other embodiments using a sensor 44 that measures the angle of the trailer 30 (either directly or indirectly), it is possible for the user to program setpoints 98, slope, and positions for the linear actuator 42 for the predetermined limits, such as shown in FIG. 10B.

An optional handheld control (not shown) is in communication with the controller 92 and may be in the form of a wireless or wired remote control, mobile device application, or other method to move the linear actuator 42, read information and status of the sensor 44, read the position of the linear actuator 42, assist the user with troubleshooting, or add position presets for the fore/aft position of the gooseneck ball 46. The power cord 94 receives power from an existing vehicle wiring harness or trailer connection.

Figure 11:
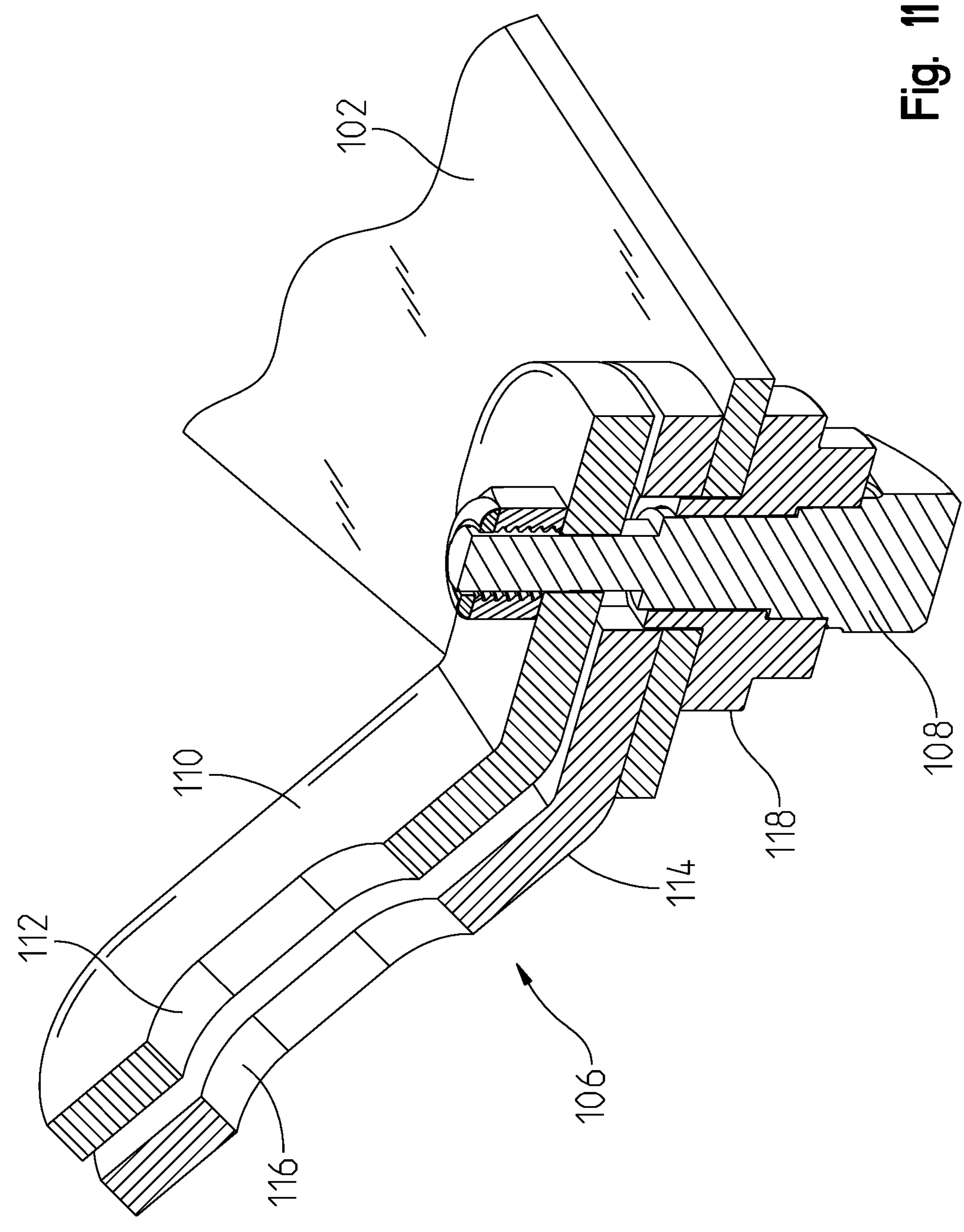
FIG. 11 is an isometric section view 11-11 of the fastener portion of the coupler in FIG. 4.

The base frame 40 includes a fore mounting portion 100, an aft mounting portion 102, and a stem 104. The fore and aft mounting portions 100, 102 and stem 104 are affixed to the linear actuator 42. The mounting portions 100, 102 have rotatable fasteners 106 to mate with the anchor points 24. Each fastener 106 has a rotatable shaft 108 that is fixed with respect to a locking handle 110, such that rotating the locking handle 110 also rotates the rotatable shaft 108. At the end of each rotatable shaft is a key feature that rotates with the shaft 108 and locks to the anchor points 24 when received by them and the locking handle 110 is then rotated to the locked position. A fixed handle 114 is adjacent the locking handle 110. When the locking handle 110 is rotated to a locked position, shown in FIG. 11, the locking handle 110 and fixed handle 114 are in alignment such that locking apertures 112, 116 in the handles are in alignment to receive a lock, pin, or other device to prevent the locking handle 110 from being rotated away from the locked position. The rotatable fasteners 106 also include an alignment bushing 118 that centers the rotatable shaft 108 and provides the proper alignment for engagement with locking features in the anchor points 24.

The stem 104 has a stem axis 105 and mates with the gooseneck pocket 22 and has a major diameter 120 and a minor diameter 122. As installed on the towing vehicle 12, the minor diameter 122 is located inside the gooseneck pocket 22 and the step 124 where the major diameter 120 begins and is supported by the gooseneck pocket 22. As shown, the stem 104 is affixed in an aperture 126 in the bottom plate 52 of the linear actuator 42. As the linear actuator 42 moves between the fore and aft positions, the gooseneck axis 45 crosses the stem axis 105. It is also contemplated that the linear actuator 42 is affixed to or integrated with the trailer 30 or gooseneck coupler 32. In the embodiment shown herein, the stem 104 is only located in the gooseneck pocket 22 and not affixed thereto. The coupler 10 is affixed to the vehicle using the rotatable fasteners 106.

Figure 3:
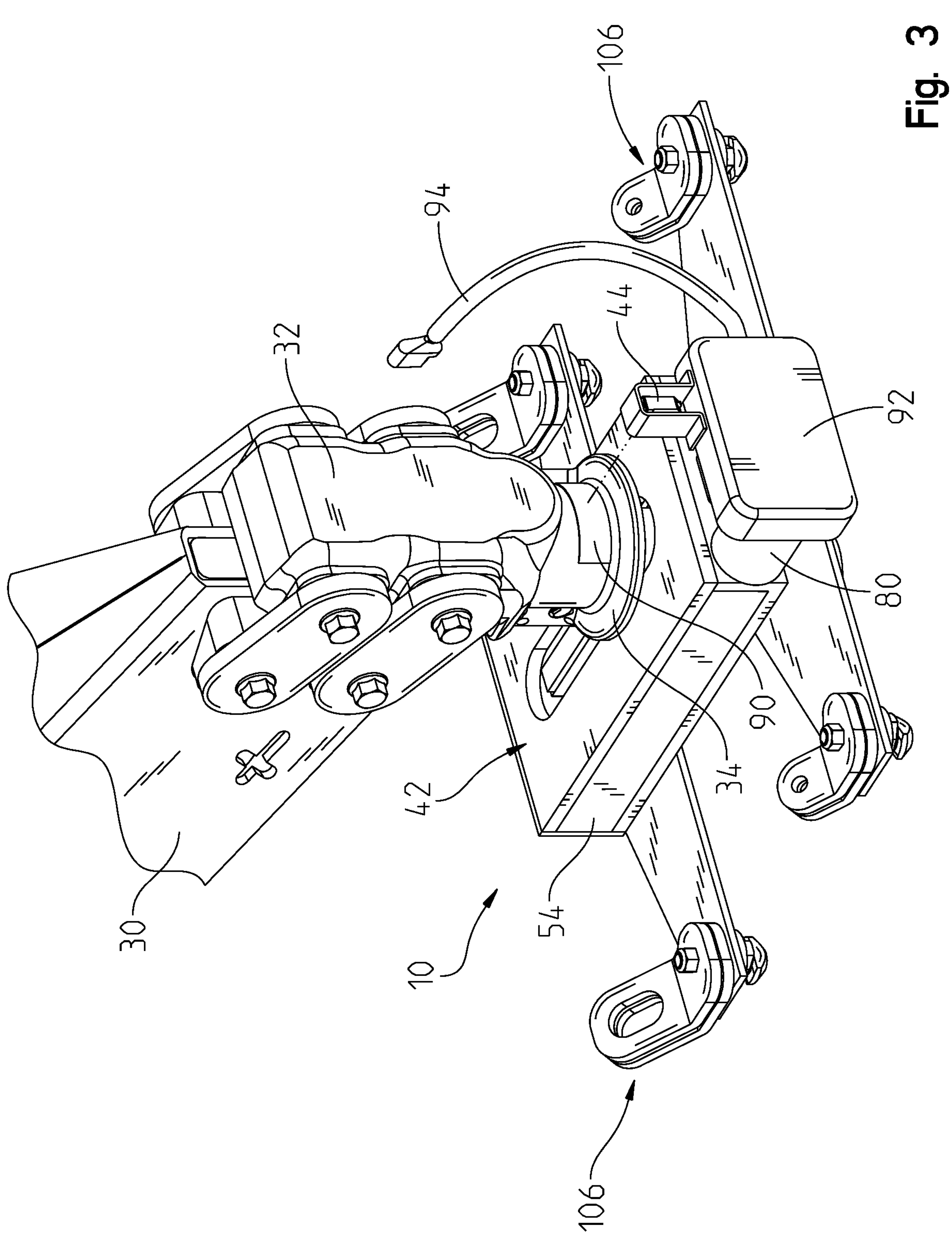
FIG. 3 is a front isometric view of the coupler and front portion of the trailer in FIG. 1.
Figure 4:
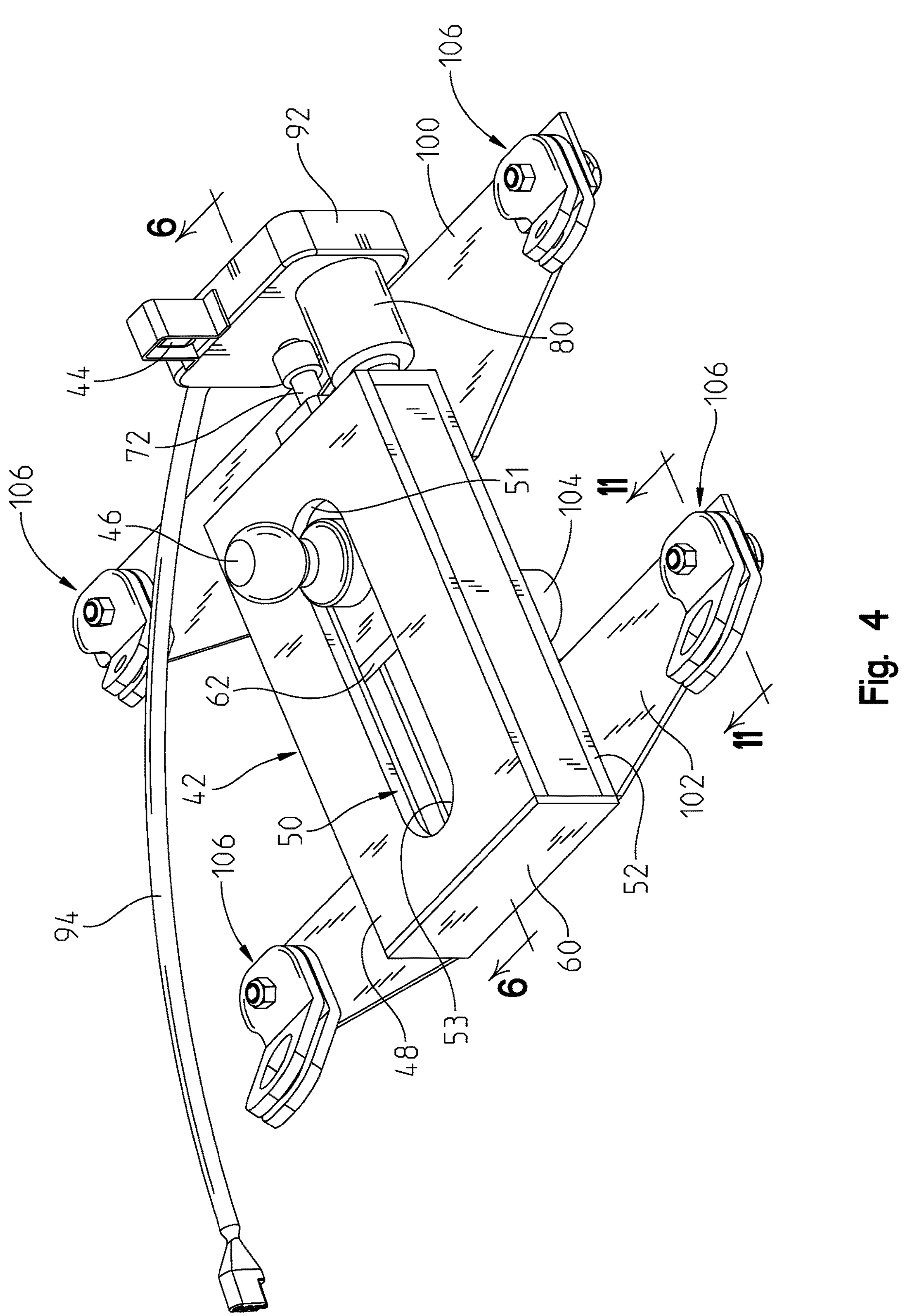
FIG. 4 is a rear isometric view of the coupler.
Figure 5:
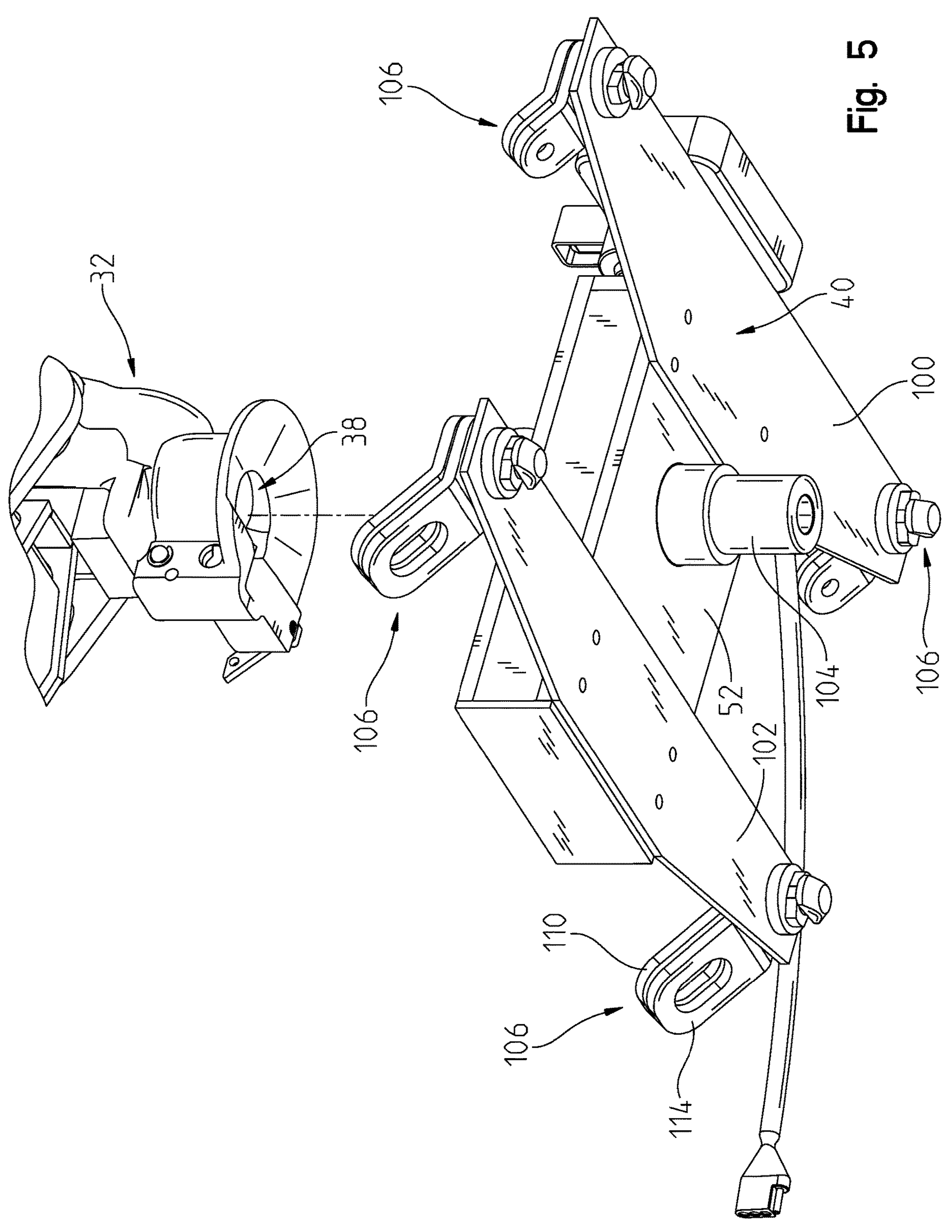
FIG. 5 is a bottom isometric view of the coupler.

As previously described, the gooseneck coupler 32 attaches or is affixed to the frame of the trailer 30. As shown in FIG. 3, the gooseneck coupler 32 mates to the gooseneck ball 46 to connect the trailer 30 to the towing vehicle 12. The gooseneck coupler 32 is moveable between a locked position and an unlocked position. In the locked position, the gooseneck ball 46 is trapped within a gooseneck ball cavity 38. In the unlocked position, the gooseneck ball 46 can enter or exit the gooseneck ball cavity 38 for mating and unmating with the gooseneck ball 46.

To install the trailer coupler 10 on the towing vehicle 12, the user first rotates the rotatable fasteners 106 to the unlocked position and removes any dust covers from the gooseneck pocket 22 and anchor points 24 on the towing vehicle 12. The user then aligns the stem 104 to the gooseneck pocket 22 and lowers the coupler 10 to mate the rotatable fasteners 106 with the anchor points 24. The user then rotates the rotatable fasteners 106 to the locked position and adds any locks or pins as needed or required. The user then connects the power cord 94 to the vehicle 12. Once power is applied to the coupler 10, the user can then jog the actuator 42 to move the gooseneck ball 46 to the desired starting position. If the trailer 30 is not mated to the gooseneck ball 46 or if the flag 90 is not affixed to the gooseneck coupler 32, the controller 92 may move the gooseneck ball 46 to the aft position. Once the trailer 30 is coupled to the gooseneck ball 46 and the flag 90 is detected by the sensor 44, the controller moves the gooseneck ball 46 to the fore position. During normal towing (where the towing vehicle 12 and trailer 30 are aligned), the controller 92 maintains the gooseneck ball 46 in the fore position. The fore position is either determined by a preset that the user has set, or it is fully forward where the linear actuator 42 has reached a mechanical limit. If the towing vehicle 12 and trailer 30 are moved out of alignment (such as when backing into a parking space or navigating a tight turn), the flag 90 rotates out of view of the sensor 44 and the controller 92 moves the gooseneck ball 46 to the aft position. The aft position is either determined by a preset that the user has set or it is fully rearward where the actuator 42 has reached a mechanical limit, such as the gooseneck ball contacting the aft end 53 of the elongate slot 50.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An assembly for attaching a trailer to a towing vehicle, said towing vehicle having an axle, said assembly comprising:

a base frame configured to be removably affixed to said towing vehicle with said base frame partially overlaying said axle;

a stem affixed to said base frame, said stem having a stem axis, said gooseneck ball having a gooseneck axis, said base frame having at least one fastener rotatable between a locked position and an unlocked position, a first position defined by said gooseneck axis being forward of said stem axis, a second position defined by said gooseneck axis being rearward of said stem axis;

a linear actuator having a stationary portion affixed to said base frame and a movable portion affixed to a gooseneck ball, said movable portion longitudinally moveable between a fore position and an aft position;

a controller in electrical communication with a sensor and said linear actuator; and when said sensor detects a first angle between said trailer and said towing vehicle, said linear actuator moves said gooseneck ball to said first position, when said sensor detects a second angle between said trailer and said towing vehicle, said linear actuator moves said gooseneck ball to said second position.

2. The assembly of claim 1, wherein said towing vehicle has a gooseneck pocket and at least two anchor points offset from said gooseneck pocket, said gooseneck pocket for receiving said stem, one of said anchor points for receiving said fastener, when said fastener is received by a corresponding said anchor point and said gooseneck pocket receives said stem, said base frame is affixed to said towing vehicle.

3. The assembly of claim 1, when said assembly is affixed to said towing vehicle, said first position is defined by said gooseneck ball being forward of said axle, said second position is defined by said gooseneck ball being rearward of said axle.

4. The assembly of claim 1, wherein said towing vehicle having parallel rails affixed thereto, said base frame affixable to said parallel rails.

5. The assembly of claim 1, further comprising a coupler for being affixed to said trailer, said coupler is mateable to said gooseneck ball.

6. The assembly of claim 5, further comprising a flag being fixed with respect to said coupler, said first angle is defined by said flag in view of said sensor.

7. The assembly of claim 5, wherein said sensor is fixed with respect to said base frame, a flag is affixed to said coupler.

8. The assembly of claim 1, wherein all forces applied to said gooseneck ball transfer to said vehicle through said linear actuator.

9. The assembly of claim 1, wherein said linear actuator has a bottom plate and a top plate, said top plate is spaced from and parallel to said bottom plate, said top plate having an elongate slot, said movable portion comprising a sliding block constrained between said top and bottom plates, said gooseneck ball is affixed to said sliding block and extending through said elongate slot in said top plate, said fore position is defined by said gooseneck ball located adjacent one end of said elongate slot, said aft position defined by said gooseneck ball located adjacent another end of said elongate slot opposite said fore position.

10. A dynamically adjustable connection for coupling a trailer to a towing vehicle having an axle, said connection comprising:

a linear actuator having a bottom plate and a top plate, said top plate having an elongate slot, a sliding block constrained between said top and bottom plates, a gooseneck ball affixed to said sliding block and extending through said elongate slot in said top plate, said gooseneck ball and said sliding block movable between an aft position and a fore position, said gooseneck ball having a gooseneck axis;

a stem having a stem axis affixed to said bottom plate, said stem for being received by a gooseneck pocket on said towing vehicle, said linear actuator having at least one fastener rotatable between a locked position and an unlocked position;

a motor coupled to said sliding block and in electrical communication with a controller;

a sensor in electrical communication with said controller;

when trailer is coupled to said gooseneck ball, said sensor detects an angle between said towing vehicle and said trailer, when said angle is over a predetermined limit, said motor moving said gooseneck ball towards said aft position, when said angle is below said predetermined limit, said motor moving said gooseneck ball towards said fore position; and said gooseneck axis is coaxial with said stem axis at a point between said fore and aft positions, said fore position defined by said gooseneck axis being forward of said stem axis, said aft position defined by said gooseneck axis being rearward of said stem axis.

11. The connection of claim 10, wherein said towing vehicle has at least two anchor points offset from said gooseneck pocket, when one of said anchor points receives said fastener, when said fastener is received by a corresponding said anchor point and said gooseneck pocket receives said stem, said linear actuator is affixed to said towing vehicle.

12. The connection of claim 10, when said connection is affixed to said towing vehicle, said fore position is defined by said gooseneck ball being forward of said axle, said aft position is defined by said gooseneck ball being rearward of said axle.

13. The connection of claim 10, wherein said gooseneck ball is fixed from rotation with respect to said linear actuator.

14. The connection of claim 10, further comprising a coupler for being affixed to said trailer, said coupler is mateable to said gooseneck ball.

15. The connection of claim 14, further comprising a flag being fixed with respect to said coupler, said sensor is fixed with respect to said linear actuator.

16. A method of towing a trailer comprising:

providing a towing vehicle having an axle and a mounting platform located above said axle;

affixing a linear actuator to said mounting platform, said linear actuator having a gooseneck ball extending vertically therefrom and longitudinally moveable between a fore position and an aft position, said fore position defined by said gooseneck ball located forward of said axle, said aft position defined by said gooseneck ball located rearward of said axle;

providing a gooseneck receiver on said mounting platform, providing a stem having a stem axis on said linear actuator, locating said stem in said gooseneck receiver, said gooseneck ball having a gooseneck axis parallel to said stem axis, said gooseneck axis is coaxial with said stem axis at a point between said fore and aft positions, said fore position defined by said gooseneck axis being forward of said stem axis, said aft position defined by said gooseneck axis being rearward of said stem axis;

providing a sensor in communication with a controller, said controller in communication with said linear actuator;

providing a trailer coupler affixed to said trailer;

coupling said trailer coupler to said gooseneck ball;

said sensor detecting an angle between said trailer and said towing vehicle; and said controller moving said gooseneck ball toward said aft position when said angle between said trailer and said towing vehicle is over a predetermined limit, said controller moving said gooseneck ball toward said fore position when said angle between said trailer and said towing vehicle is below said predetermined limit.

17. The method of claim 16, further providing a flag affixed to said trailer coupler, said sensor and said flag cooperating to detect said angle between said trailer and said towing vehicle.

18. The method of claim 16, further providing a pair of parallel rails affixed to said mounting platform, said linear actuator affixed to said pair of rails.

* * * * *